United States Patent [19]

Menke

[11] 4,396,327
[45] Aug. 2, 1983

[54] SCREW CAPTURE

[75] Inventor: Manfred Menke, Ritterhude, Fed. Rep. of Germany

[73] Assignee: Erno Raumfahrttechnik GmbH, Bremen, Fed. Rep. of Germany

[21] Appl. No.: 194,089

[22] Filed: Oct. 6, 1980

[30] Foreign Application Priority Data

Oct. 17, 1979 [DE] Fed. Rep. of Germany ....... 2941923

[51] Int. Cl.³ .......................................... F16B 37/04
[52] U.S. Cl. ...................................... 411/337; 29/434; 29/525; 411/103; 411/511
[58] Field of Search ............... 411/337, 511, 360, 571, 411/103, 108, 113, 111, 366, 367, 368, 548, 81, 107, 133, 132, 338, 352, 361; 29/525, 434; 36/59

[56] References Cited

U.S. PATENT DOCUMENTS

| 1,553,967 | 9/1925 | Unger | 411/338 X |
| 1,949,333 | 2/1934 | Saunders | 411/457 X |
| 3,126,935 | 3/1964 | Tuozzo | 411/361 X |
| 3,245,273 | 4/1966 | Loper et al. | 29/525 X |
| 3,252,493 | 5/1966 | Smith | 411/108 |

Primary Examiner—Ramon S. Britts
Attorney, Agent, or Firm—Ralf H. Siegemund

[57] ABSTRACT

A screw is captured in an assembly of concentric sleeves, the inner one of which has a flange, and an outer workpiece is clamped between the flange and the outer sleeve. The outer workpiece has a sufficiently large, beveled bore to permit radial play of the assembly. The outer sleeve has a threaded inner flange at the other end; and the two sleeves are assembled in press fit.

4 Claims, 4 Drawing Figures

SCREW CAPTURE

BACKGROUND OF THE INVENTION

The present invention relates to screw-fastening; and more particularly, the invention relates to the capture of screws by means of which construction parts are interconnected.

Known fastening techniques include the capture of a screw in the following manner. A sleeve without internal threads is secured to the part having a bore for receiving the screw and in concentric relation to the sleeve. The sleeve will receive the screw once it has been threaded into the bore. It is apparent that tooling is needed to fasten the sleeve to the particular part in the particular concentric relation. Also, removal of the screw requires either special tooling or destruction of the sleeve.

DESCRIPTION OF THE INVENTION

It is an object of the present invention to capture a screw in such a a manner that it can be unfastened without special tooling.

In accordance with the preferred embodiment, it is suggested to provide a two-part capture device, having an outer sleeve which bears against one of the parts to be fastened as the screw head bears against that sleeve from the other end, while an inserted inner sleeve, preferably in press fit, is traversed by the screw and has a flange, preferably a conical flange which bears against that one part from the other side. The outer sleeve has preferably a short, outer thread for threadedly receiving and passing through the threaded portion of the screw.

The inner sleeve is preferably sufficiently small so that it can radially move in the bore of the particular workpiece and part through which it passes; but the flange of that inner sleeve must be sufficiently large so that it is captured from the inside. Thus, the screw with the assembled two-sleeve capturing device can be radially shifted to some extent in relation to that one workpiece so that the screw can be centered in relation to the other workpiece. This way, one avoids binding or other clamping.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

As stated above, the inventive screw-capturing device is comprised of two parts, one is shown by itself in FIG. 1, the other one in FIG. 2. FIG. 1 illustrates an outer sleeve 1 having a conical outer contour 2 and cylindrical inner contour 16. The upper end 3 of sleeve 1 is provided with a radially inwardly extending flange 4 with a single turn or a few turns of thread 5. Flange 4 serves as stop and rest for the head of a screw (FIG. 3) to be inserted. The thread 5 permits threading-through of the thread 6 of screw 7. The sleeve 1 has a lower, flat, axial end face 9.

FIG. 2 illustrates the inner sleeve 12 of the assembly to be made. This sleeve has a cylindrical part 15 with a beveled edge 14 at its upper end 13. This edge facilitates insertion into sleeve 1 (FIG. 1). The lower end of the sleeve is provided with a conical flange 18 and has a flat annular end face 17. The outer diameter of cylinder 15 is slightly larger than the inner diameter of cylindrical wall 16 of sleeve 1 so that the inner sleeve 12 will be held in outer sleeve 1 by means of a press fit.

FIG. 3 illustrates the preferred form for a screw 7 to be used. The thread 6 of the screw permits and requires screw-type feed-through in threads 5 of sleeve 1. On the other hand, screw 7 has a shank portion 8 of reduced diameter to permit clear passage through the thread portion 5 of flange 4. Thus, once the screw has been threaded through threads 5, it can be moved conveniently in axial direction over a range given by the axial dimensions of shank 8. The head 24 of the screw will not pass flange 4 so that the screw hangs in sleeve 1.

FIG. 4 shows the completed assembly particularly for fastening a flat part 11 to a construction part 23. The part 23 has a threaded bore 21 for threadedly receiving the thread 6 of screw 7. Part 11 has a larger diameter bore with a beveled, undercut, inner periphery and conical surface 19. Reference numeral 20 refers to the inside surface of part 11 by means of which it interferes with part 23. This surface has been provided with the bevel 19 prior to assembly. The outside face, opposite surface 20 of workpiece 11, is denoted by numeral 10.

Figure 1:
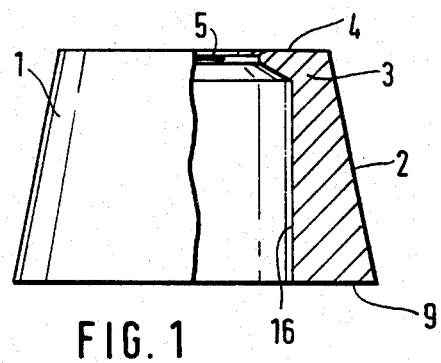
FIG. 1 illustrates, partially in section, a first element (outer sleeve) of the preferred embodiment of the present invention.
Figure 2:
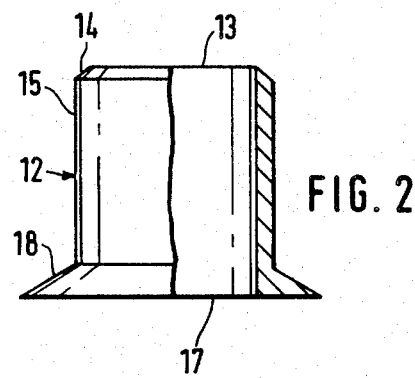
FIG. 2 is also a partial section of a second, complementary element (inner sleeve)
Figure 3:
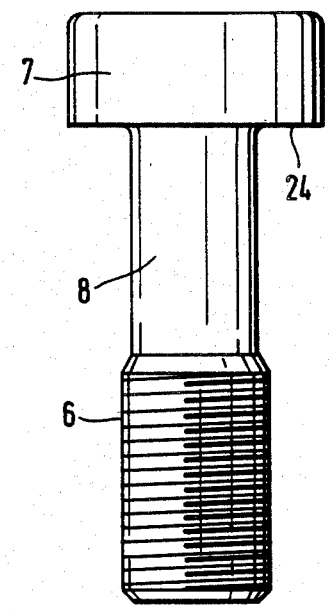
FIG. 3 illustrates a particular screw to be used with the parts of FIGS. 1 and 2.
Figure 4:
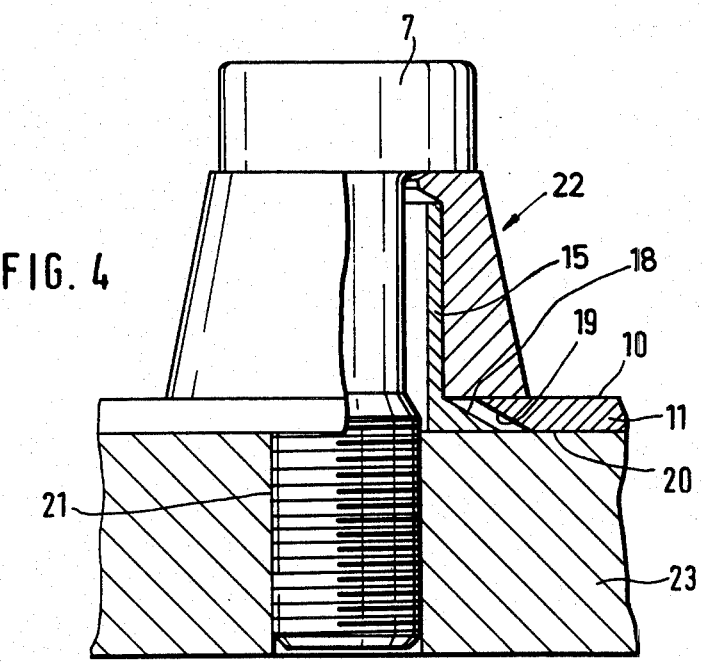
FIG. 4 illustrates, also partially in section, an assembly of the parts shown in FIGS. 1, 2, and 3 in accordance with the best mode of practicing the invention.

The assembly is effected as follows: inside, or inner, sleeve 12 is inserted into the bore in part 11, from the side 20 thereof; the part has not yet been juxtaposed to part 23. The smallest diameter of the beveled bore in part 11 is smaller than the largest diameter of flange 18 being the outer diameter of sleeve portion 12 so that the flange 18 fits with ample play into the beveled bore of part 11, but cannot pass through because the largest diameter of flange 18 is larger than the smallest diameter of the bore in part 11 (smallest diameter of cone 19).

Next, sleeve 1 is forced onto the sleeve 12 from the other side of part 11 until end face 17 of sleeve 12 is flush with surface 20, but face 9 may not yet bear against part 11 on the other side 10. At any time, i.e. prior to or subsequent to assembly of sleeves 1 and 12, screw 7 will be threaded through thread 5 to hang in sleeve 1. Since the shank 8 has a certain axial length, the threaded screw part 6 will be inside sleeve 12; and once sleeves 1 and 12 are telescoped into each other, one can seek still proper alignment of the screw with the bore 21 because the two sleeve assemblies, 22, can be shifted radially due to the wider opening of surface 19 defining the bore in part 11.

This aspect is particularly important when several screws are used, and the bore-to-bore distances in part 23 may well have, certain tolerances, particularly in regard to the companion bores in part 11. The known capture sleeves of the tolerances, the radially displaceable and adjustable sleeve assembly 22, however, does permit that compensation because of radial and axial mobility of the captured screw vis-a-vis both workpieces (11 and 23). Clamping, and so forth, is readily avoided as the screw is now threaded into the bore 21.

Screw 7 is screwed into the bore 21 until the lower end face of head 24 rests against the outside of flange 4 of outer sleeve 1, whereupon the sleeve 1 may be forced down further until its end 9 abuts against the outer surface of part 11. This then completes the fastening process.

Removal simply requires a screw driver to unthread the screw out of bore 21. Next, the screw part 6 may be threaded into threads 5 and, upon pulling, sleeve 1 is removed from sleeve 12. Ease here depends upon the extent of the press fit; one may need some pliers in addition. However, this complete disassembly may not be needed, the removal may be only a temporary one so that possibly all capture devices and screws remain on part 11 until refastening is desired. One may wish to exchange the screws only, in which case 22 will remain assembled. Complete disassembly will be possible after removal of part 11, and now sleeve 12 is simply taken out. All parts are reusable.

The invention is not limited to the embodiments described above; but all changes and modifications thereof, not constituting departures from the spirit and scope of the invention, are intended to be included.

I claim:

1. A screw-fastening assembly, including a device for capturing a screw which fastens two parts together, comprising:
    a first, outer sleeve having an axial end face for bearing against an outer surface of one of the two parts without being fastened thereto independently from said screw; and
    a second, inner sleeve being press fit the outer sleeve and having an axially and radially extending flange for bearing against a surface portion of said one part opposite said outer surface and without being fastened thereto independently from the screw so that the screw, upon being inserted into the sleeves and threaded into the other one of the two parts, will be held by the outer sleeve, the outer sleeve having a radially inwardly extending flange with threads for threaded through-passing of the screw, the sleeves having dimensions for being permitted radial, lateral movement relative to said parts for centering the screw in relation to a bore hole in the said other part.

2. A device as in claim 1, the flange being of beveled, conical configuration.

3. A fastener assembly, comprising:
    a first, outer sleeve having a cylindrical interior and a threaded inner flange on one end;
    a second, inner sleeve having a cylindrical exterior dimensioned to press fit into the outer sleeve, having also a beveled flange extending axially and radially from the opposite end of the first sleeve when inserted therein; and
    a screw having an unthreaded shank portion adjacent to an enlarged head which shank portion is of smaller diameter than that of the said inner flange and having a threaded portion at the other end, threadedly fitting said threaded inner flange but extending beyond the beveled flange when the head abuts the inner flange.

4. A device as in claim 1 or 3, the outer sleeve having a conical outer contour.

* * * * *